W. BARTO.
DRAFT ATTACHMENT AND EVENER.
APPLICATION FILED JULY 6, 1908.

924,529.

Patented June 8, 1909.
2 SHEETS—SHEET 1.

Witnesses
C. E. Smith.
Fenton S. Belt.

Inventor
William Barto

By Wm Bagger & Co.
Attorneys

W. BARTO.
DRAFT ATTACHMENT AND EVENER.
APPLICATION FILED JULY 6, 1908.

924,529.

Patented June 8, 1909.
2 SHEETS—SHEET 2.

Witnesses
C. E. Smith.
Fenton S. Belt.

Inventor
William Barto
By Wm. Bagger & Co.
Attorneys

UNITED STATES PATENT OFFICE.

WILLIAM BARTO, OF BREWSTER, KANSAS.

DRAFT ATTACHMENT AND EVENER.

No. 924,529.　　　Specification of Letters Patent.　　　Patented June 8, 1909.

Application filed July 6, 1908.　Serial No. 442,084.

*To all whom it may concern:*

Be it known that I, WILLIAM BARTO, a citizen of the United States, residing at Brewster, in the county of Thomas and State of Kansas, have invented certain new and useful Improvements in Draft Attachments and Eveners, of which the following is a specification.

This invention relates to draft attachments, or devices for applying draft to plows and other implements where it is desirable that the draft animals walking abreast, shall walk at one side of the line of progress, so as to avoid, as far as possible, walking in the furrows that have been upturned by a previous passage of the implement.

The invention has for its object to simplify and improve the construction and operation of this class of devices, and to provide a draft attachment of simple and efficient construction which shall also operate as an evener, so that the draft will be properly applied in the most efficient manner.

With these and other ends in view which will readily appear as the nature of the invention is better understood, the same consists in the improved construction and novel arrangement and combination of parts which will be hereafter fully described and particularly pointed out in the claim.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

Figure 1:
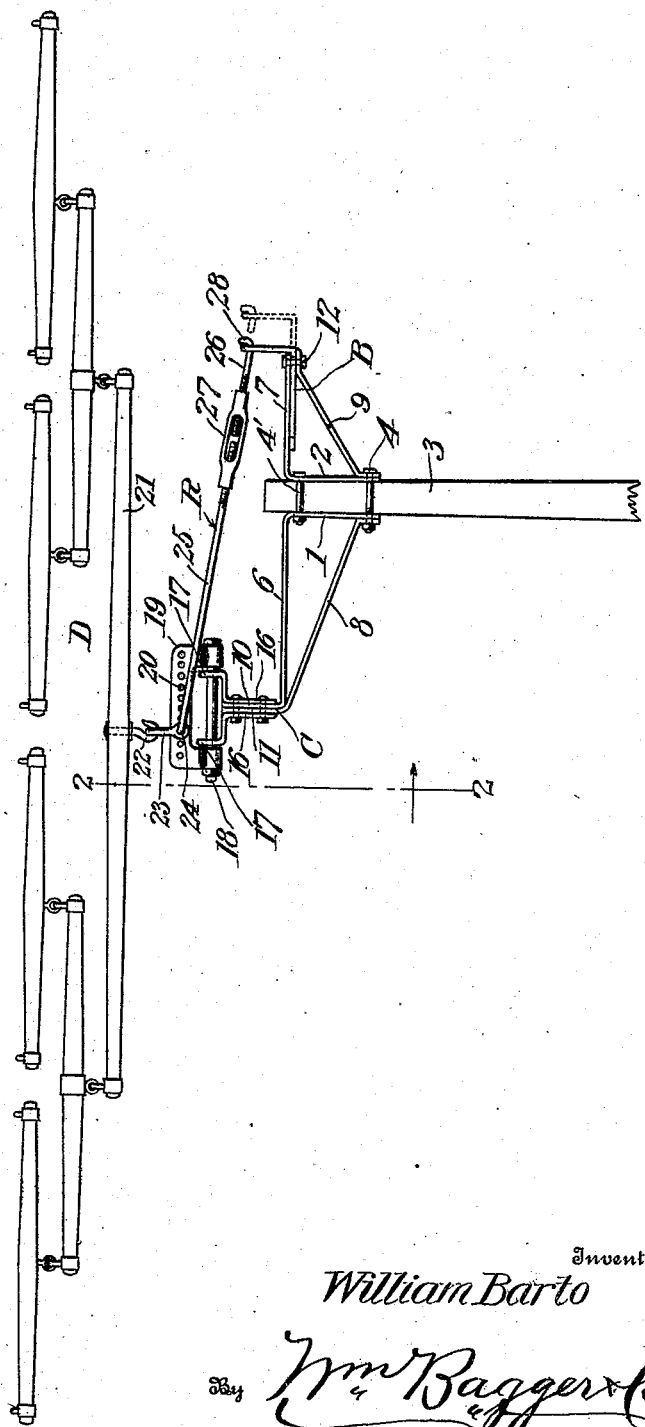
Figure 2:
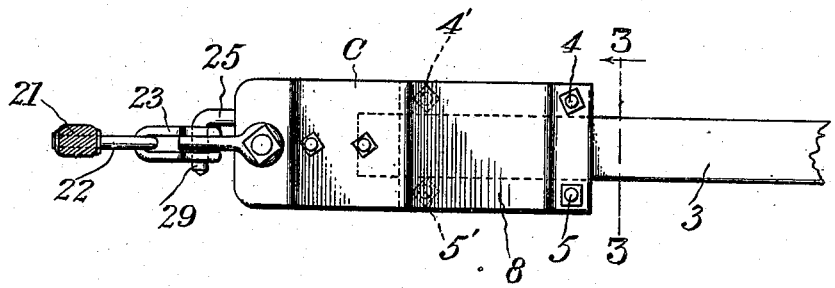
Figure 3:
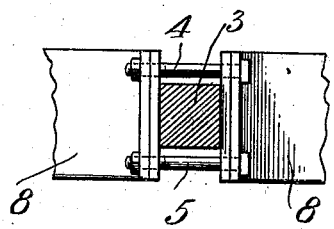
Figure 4:
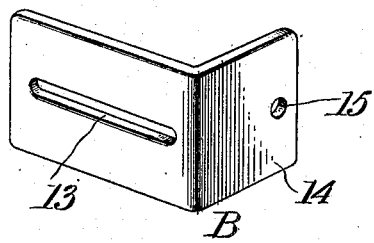

In the drawings—Figure 1 is a top plan view of a draft attachment and evener constructed in accordance with the invention. Fig. 2 is a sectional elevation taken on the plane indicated by the line 2—2, Fig. 1. Fig. 3 is a transverse sectional detail view taken on the plane indicated by the line 3—3, Fig. 2. Fig. 4 is a perspective detail view of the adjustable extension bracket.

Corresponding parts in the several figures are denoted by like characters of references.

The improved draft attachment or appliance comprises a pair of side members or plates 1, 2, fitted against the opposite sides of the plow beam, tongue or other draft member 3, upon which the said side members are securely clamped by means of bolts 4, 4', and 5, 5', the bolts 4, 4' being adjacent to the upper side, and the bolts 5, 5', adjacent to the lower side of the beam or draft member 3. The plates or side members 1, 2, are provided at their front ends with laterally extending arms 6, 7, the outer extremities of which are connected by means of braces 8, 9, with the rear clamping bolts 4, 5. The arm 6 and the brace 8 are provided at their outer ends with forward extensions 10, 11, lying closely adjacent to each other, and combining to form a forward extending bracket; the outer extremities of the arm 7 and the brace 9 are connected together by a clamping bolt 12, and between said arm and brace there is interposed an angular or L-shaped extension bracket B, having a slot 13 engaging the bolt 12, upon which the said extension bracket is thus adjustably mounted; the forward extending arm 14 of the bracket B, being provided with an aperture 15 for the reception of one end of an adjustable brace rod, as will be presently more fully described.

The forward extending bracket, C, which if formed by the contiguous forward extensions 10, 11, at the outer ends of the arm 6 and the brace 8, serves for the attachment of a pair of angle-plates 16, having forward extending ears 17 that are apertured for the passage of a pin or bolt 18, upon which the draw-head 19 is hingedly supported; said draw-head consisting of an approximately U-shaped plate, the cross-bar of which is provided with a plurality of apertures 20.

An evener or draft equalizer D, which may be of any suitable construction, and which may be adapted for the attachment of three, four or more draft animals, includes a whiffletree 21, having a hook 22, or other suitable connecting means engaging a clip or clevis 23, which latter straddles the draw-head 19, and is connected with said draw-head by means of an adjustable brace rod R, comprising two members 25, 26, that are adjustably connected by means of a turn buckle 27; one of said members 26, being provided with a terminal hook 28, engaging the aperture 15 in the extension bracket B, while the other member 25 is provided with a terminal down-turned hook 29, that extends through the eyes 24 of the clevis 23, and through one of the apertures 20 in the draw head, thus constituting the means whereby said clevis is connected with the draw head for the attachment of the draft.

The operation and advantages of this invention will be readily understood from the foregoing description taken in connection with the drawings hereto annexed. The construction is very simple, and it will be readily seen that the line of draft may be adjusted laterally by properly adjusting the extension bracket B, and the brace rod R, as well as by changing the point of attachment of the clevis 23 to the draw head 19. Any desired change may be effected very quickly and easily and the device will be found thoroughly efficient and satisfactory for the purposes for which it is provided.

Having thus described the invention what is claimed is:

In a draft appliance, a beam, plates clamped upon the sides of the beam and having laterally extending arms, braces extending from the outer extremities of the arms to the rear ends of the plates, clamping bolts extending through the plates and braces adjacent to the upper and lower sides of the beams, a bracket member clamped adjustably between the outer extremities of the arm and brace at one side of the beam, angle plates connected at the outer extremities of the arm and brace at the opposite side of the beam, a draw head hingedly connected with the angle plates and having vertical apertures, a clevis straddling the draw head and having eyes registering with one of the apertures, and an adjustable brace rod comprising separate members and a turn-buckle adjustably connecting said members; said brace rod being provided with a terminal hook at one end engaging the adjustable extension plate, and a terminal hook at its opposite end extending through the eyes in the clevis and through the registering aperture in the draw head.

In testimony whereof I affix my signature in presence of two witnesses.

WILLIAM BARTO.

Witnesses:
 A. HAWK,
 H. P. VON AHK.